US012731298B2

(12) United States Patent
Zafar et al.

(10) Patent No.: US 12,731,298 B2
(45) Date of Patent: Sep. 8, 2026

(54) METHOD AND DATA PROCESSING SYSTEM FOR LOSSY IMAGE OR VIDEO ENCODING, TRANSMISSION AND DECODING

(71) Applicant: INTERDIGITAL VC HOLDINGS, INC., Wilmington, DE (US)

(72) Inventors: Arsalan Zafar, London (GB); Jan Xu, London (GB); Christian Besenbruch, London (GB); Bilal Abbasi, London (GB); Aleksandar Cherganski, London (GB); Chris Finlay, London (GB); Christian Etmann, London (GB)

(73) Assignee: InterDigital VC Holdings, Inc., Wilmington, DE (US)

( * ) Notice: Subject to any disclaimer, the term of this patent is extended or adjusted under 35 U.S.C. 154(b) by 176 days.

(21) Appl. No.: 18/723,595

(22) PCT Filed: Dec. 21, 2022

(86) PCT No.: PCT/EP2022/087271

§ 371 (c)(1),
(2) Date: Jun. 24, 2024

(87) PCT Pub. No.: WO2023/118317

PCT Pub. Date: Jun. 29, 2023

(65) Prior Publication Data

US 2025/0086843 A1 Mar. 13, 2025

(30) Foreign Application Priority Data

Dec. 22, 2021 (GB) ..................................... 2118730
Dec. 22, 2021 (GB) ..................................... 2118863
(Continued)

(51) Int. Cl.
*G06T 9/00* (2006.01)

(52) U.S. Cl.
CPC .................................. *G06T 9/002* (2013.01)

(58) Field of Classification Search
CPC ..................................................... G06T 9/002
See application file for complete search history.

(56) References Cited

U.S. PATENT DOCUMENTS 11,468,265 B2 * 10/2022 Chhabra ................ G06N 3/045
11,544,880 B2 * 1/2023 Park ......................... G06N 3/08
(Continued)

FOREIGN PATENT DOCUMENTS

WO 2021220008 A1 11/2021

OTHER PUBLICATIONS

Chitwan, Saharia , et al., "Image Super-Resolution via Iterative Refinement", arxiv.org, Cornell University Library, 201 Olin Library Cornell University Ithaca, NY 14853,Jun. 30, 2021 (Jun. 30, 2021).
(Continued)

*Primary Examiner* — Gregory M Desire
(74) *Attorney, Agent, or Firm* — Condo Roccia Koptiw LLP

(57) ABSTRACT

A method for lossy image and video encoding, transmission and decoding, the method comprising the steps of: receiving an input image at a first computer system; encoding the input image using a first trained neural network to produce a latent representation; performing a quantization process on the latent representation to produce a quantized latent; transmitting the quantized latent to a second computer system; decoding the quantized latent using a denoising process to produce an output image, wherein the output image is an approximation of the input image.

10 Claims, 13 Drawing Sheets

(30) Foreign Application Priority Data

| | | |
|---|---|---|
| Jan. 25, 2022 | (GB) | 2200899 |
| Feb. 4, 2022 | (GB) | 2201471 |

(56) References Cited

U.S. PATENT DOCUMENTS

| | | | | |
|---|---|---|---|---|
| 12,481,877 | B2 * | 11/2025 | Brehmer | G06N 3/0455 |
| 12,505,342 | B2 * | 12/2025 | Kim | G06N 3/08 |
| 12,505,595 | B2 * | 12/2025 | Liu | G06T 11/60 |
| 12,541,955 | B1 * | 2/2026 | Hatamizadeh | G06V 10/7747 |
| 2022/0215265 | A1 * | 7/2022 | Jiang | G06N 3/084 |

OTHER PUBLICATIONS

Ho, J. , et al., Denoising diffusion probabilistic models. arXiv preprint arXiv:2006.11239, 2020.

Ma, S. , et al., "Image and Video Compression With Neural Networks: A Review", Apr. 10, 2019 (Apr. 10, 2019), p. 1-16.

Mentzer, F. , et al., High-fidelity generative image compression. arXiv preprint arXiv:2006.09965, 2020.

Yang, R. , et al., "Lossy Image Compression with Conditional Diffusion Models", arxiv.org, Cornell University Library, 201 Olin Library Cornell University Ithaca, NY 14853,Dec. 9, 2022 (Dec. 9, 2022).

International Search Report, dated Apr. 3, 2023, and Written Opinion issued in International Application No. PCT/EP2022/087271.

* cited by examiner

METHOD AND DATA PROCESSING SYSTEM FOR LOSSY IMAGE OR VIDEO ENCODING, TRANSMISSION AND DECODING

CROSS REFERENCE TO RELATED APPLICATIONS

This application is the National Stage Entry under 35 U.S.C. § 371 of International Application No. PCT/EP2022/087271 filed Dec. 21, 2022, which claims priority to GB Applications Nos. 2118730.7, filed on Dec. 22, 2021; 2118863.6, filed on Dec. 22, 2021; 2200899.9, filed on Jan. 25, 2022; and 2201471.6, filed on Feb. 4, 2022, the contents of each of which being fully incorporated herein by reference.

TECHNICAL FIELD

This disclosure relates to a method and system for lossy image or video encoding, transmission and decoding, a method, apparatus, computer program and computer readable storage medium for lossy image or video encoding and transmission, and a method, apparatus, computer program and computer readable storage medium for lossy image or video receipt and decoding.

BACKGROUND

There is increasing demand from users of communications networks for images and video content. Demand is increasing not just for the number of images viewed, and for the playing time of video; demand is also increasing for higher resolution content. This places increasing demand on communications networks and increases their energy use because of the larger amount of data being transmitted.

To reduce the impact of these issues, image and video content is compressed for transmission across the network. The compression of image and video content can be lossless or lossy compression. In lossless compression, the image or video is compressed such that all of the original information in the content can be recovered on decompression. However, when using lossless compression there is a limit to the reduction in data quantity that can be achieved. In lossy compression, some information is lost from the image or video during the compression process. Known compression techniques attempt to minimize the apparent loss of information by the removal of information that results in changes to the decompressed image or video that is not particularly noticeable to the human visual system.

Artificial intelligence (AI) based compression techniques achieve compression and decompression of images and videos through the use of trained neural networks in the compression and decompression process. Typically, during training of the neutral networks, the difference between the original image and video and the compressed and decompressed image and video is analyzed and the parameters of the neural networks are modified to reduce this difference while minimizing the data required to transmit the content. However, AI based compression methods may achieve poor compression results in terms of the appearance of the compressed image or video or the amount of information required to be transmitted.

SUMMARY

According to the present disclosure there is provided a method for lossy image or video encoding, transmission and decoding, the method comprising the steps of: receiving an input image at a first computer system; encoding the input image using a first trained neural network to produce a latent representation; performing a quantization process on the latent representation to produce a quantized latent; transmitting the quantized latent to a second computer system; decoding the quantized latent using a denoising process to produce an output image, wherein the output image is an approximation of the input image.

The denoising process may be performed by a trained denoising model.

The trained denoising model may be a second trained neural network.

The denoising process may be an iterative process and may include a denoising function configured to predict a noise vector; wherein the denoising function receives as input an output of the previous iterative step, the data based on the latent representation and parameters describing a noise distribution; and the noise vector is applied to the output of the previous iterative step to obtain the output of the current iterative step.

The parameters describing the noise distribution may specify the variance of the noise distribution.

The noise distribution may be a gaussian distribution.

The initial input to the denoising process may be sampled from gaussian noise.

The data based on the latent representation may be upsampled prior to the application of the denoising process.

According to the present disclosure there is provided a method of training one or more models including neural networks, the one or more models being for use in lossy image or video encoding, transmission and decoding, the method comprising the steps of: receiving a first input training image; encoding the first input training image using a first neural network to produce a latent representation; performing a quantization process on the latent representation to produce a quantized latent; decoding the quantized latent using a denoising model to produce an output image, wherein the output image is an approximation of the input training image; evaluating a loss function based on the rate of the quantized latent; evaluating a gradient of the loss function; back-propagating the gradient of the loss function through the first neural network to update the parameters of the first neural network; repeating the above steps using a first set of training images to produce a first trained neural network.

The loss function may include a denoising loss; and the denoising process may include a denoising function configured to predict a noise vector; wherein the denoising function receives as input the first input training image with added noise, the data based on the latent representation and parameters describing a noise distribution; the denoising loss is evaluated based on a difference between the predicted noise vector and the noise added to the first training image; and back-propagation the gradient of the loss function is additionally performed through the denoising model to update the parameters of the denoising model to produce a trained denoising model.

The loss function may include a distortion loss based on differences between the output image and the input training image.

According to the present disclosure there is provided a method for lossy image or video encoding and transmission, the method comprising the steps of: receiving an input image at a first computer system; encoding the input image using a first trained neural network to produce a latent representation; performing a quantization process on the latent representation to produce a quantized latent; and transmitting the quantized latent to a second computer system.

According to the present disclosure there is provided a method for lossy image or video receipt and decoding, the method comprising the steps of: receiving the quantized latent encoded according to the method for lossy image or video encoding and transmission above at a second computer system; decoding the quantized latent using a denoising process to produce an output image, wherein the output image is an approximation of the input image.

According to the present disclosure there is provided a data processing system configured to perform the method for lossy image or video encoding, transmission and decoding above.

According to the present disclosure there is provided a data processing apparatus configured to perform the method for lossy image or video encoding and transmission or the method for lossy image or video receipt and decoding above.

According to the present disclosure there is provided a computer program comprising instructions which, when the program is executed by a computer, cause the computer to carry out the method for lossy image or video encoding and transmission or the method for lossy image or video receipt and decoding above.

According to the present disclosure there is provided a computer-readable storage medium comprising instructions which, when executed by a computer, cause the computer to carry out the method for lossy image or video encoding and transmission or the method for lossy image or video receipt and decoding above.

According to the present disclosure there is provided a method of training one or more neural networks, the one or more neural networks being for use in lossy image or video encoding, transmission and decoding, the method comprising the steps of: receiving a first input training image; encoding the first input training image using a first neural network to produce a latent representation; performing a quantization process on the latent representation to produce a quantized latent; decoding the quantized latent using a second neural network to produce an output image, wherein the output image is an approximation of the input training image; evaluating a loss function based on differences between the output image and the input training image; evaluating a gradient of the loss function; back-propagating the gradient of the loss function through the first neural network and the second neural network to update the parameters of the first neural network and the second neural network; and repeating the above steps using a first set of training images to produce a first trained neural network and a second trained neural network; wherein the differences between the output image and the input training image is determined based on the output of a neural network acting as a discriminator; the neural network acting as a discriminator receives the output image as an input and outputs one or more values associated with one or more sub-sections of the output image, wherein each value indicates the likelihood that the corresponding sub-section of the output image is a fake sub-section, and back-propagation of the gradient of the loss function is additionally used to update the parameters of the neural network acting as a discriminator.

The output of the neural network acting as a discriminator may be converted to a probability distribution, wherein the value of the probability distribution is defined for each of the one or more sub-sections and is proportionate to the value indicating the likelihood that the corresponding sub-section of the output image is a fake sub-section.

The conversion to a probability distribution may be performed using a softmax function.

The method may further include the step of providing the one or more sub-sections of the output image to a neural network acting as a sub-discriminator; wherein the neural network acting as a sub-discriminator outputs one or more values associated with the one or more sub-sections of the output image, each value indicating the likelihood that the corresponding sub-section of the output image is a fake sub-section; and the differences between the output image and the input training image is additionally determined based on the output of the neural network acting as a sub-discriminator; and back-propagation of the gradient of the loss function is additionally used to update the parameters of the neural network acting as a sub-discriminator.

The one or more sub-sections of the output image may be determined by sampling the probability distribution.

Two to five sub-sections of the output image may be provided to the neural network acting as a sub-discriminator, preferably three sub-sections of the output image may be provided.

The neural network acting as a discriminator may additionally receive the quantized latent as an input.

The method may further comprise the steps of, after the output of the neural network acting as a discriminator is converted to a probability distribution: sampling the probability distribution to select a sub-section of the output image; encoding the corresponding sub-section of the input image to the selected sub-section of the output image using the first neural network to produce a sub-latent representation; performing a quantization process on the sub-latent representation to produce a quantized sub-latent; decoding the quantized sub-latent using a second neural network to produce an output sub-image, wherein the output sub-image is an approximation of the sub-section of the input image; wherein the evaluation of the loss function and back propagation of the gradient of the loss function to update the parameters of the neural networks is performed based on the output sub-image and the sub-section of the input image.

According to the present disclosure there is provided a method for lossy image or video encoding, transmission and decoding, the method comprising the steps of: receiving an input image at a first computer system; encoding the first input training image using a first trained neural network to produce a latent representation; performing a quantization process on the latent representation to produce a quantized latent; transmitting the quantized latent to a second computer system; and decoding the quantized latent using a second trained neural network to produce an output image, wherein the output image is an approximation of the input training image; wherein the first trained neural network and the second trained neural network have been trained according to the method of training one or more neural networks above.

According to the present disclosure there is provided a method for lossy image or video encoding and transmission, the method comprising the steps of: receiving an input image at a first computer system; encoding the first input training image using a first trained neural network to produce a latent representation; performing a quantization process on the latent representation to produce a quantized latent; transmitting the quantized latent; wherein the first trained neural network has been trained according to the method of training one or more neural networks above.

According to the present disclosure there is provided a method for lossy image or video receipt and decoding, the method comprising the steps of: receiving the quantized latent according to the method of claim 10 at a second computer system; and decoding the quantized latent using a second trained neural network to produce an output image, wherein the output image is an approximation of the input training image; wherein the second trained neural network has been trained according to the method of training one or more neural networks above.

According to the present disclosure there is provided a data processing system configured to perform the method of the method of training one or more neural networks or the method for lossy image or video encoding, transmission and decoding above.

According to the present disclosure there is provided a data processing apparatus configured to perform the method for lossy image or video encoding and transmission or for lossy image or video receipt and decoding described above.

According to the present disclosure there is provided a computer program comprising instructions which, when the program is executed by a computer, cause the computer to carry out the method for lossy image or video encoding and transmission or for lossy image or video receipt and decoding described above.

According to the present disclosure there is provided a computer-readable storage medium comprising instructions which, when executed by a computer, cause the computer to carry out the method for lossy image or video encoding and transmission or for lossy image or video receipt and decoding described above.

According to the present disclosure there is provided a method of training one or more neural networks, the one or more neural networks being for use in lossy image or video encoding, transmission and decoding, the method comprising the steps of: receiving a first input training image; encoding the first input training image using a first neural network to produce a latent representation; performing a quantization process on the latent representation to produce a quantized latent; decoding the quantized latent using a second neural network to produce an output image, wherein the output image is an approximation of the input training image; evaluating a loss function based on differences between the output image and the input training image; evaluating a gradient of the loss function; back-propagating the gradient of the loss function through the first neural network and the second neural network to update the parameters of the first neural network and the second neural network; and repeating the above steps using a first set of training images to produce a first trained neural network and a second trained neural network; wherein the differences between the output image and the input training image is determined based on the output of a neural network acting as a discriminator; the neural network acting as a discriminator receives an additional input; the additional input is based on the first input training image, and back-propagation of the gradient of the loss function is additionally used to update the parameters of the neural network acting as a discriminator.

The input training image may be additionally processed by a third trained neural network; and the additional input is the output of the third trained neural network, At least one of the layers of the neural network acting as a discriminator that receives an input based on the additional input may be narrow with respect to the input training image.

According to the present disclosure there is provided a method of training one or more neural networks, the one or more neural networks being for use in lossy image or video encoding, transmission and decoding, the method comprising the steps of: receiving a first input training image; encoding the first input training image using a first neural network to produce a latent representation; performing a quantization process on the latent representation to produce a quantized latent; decoding the quantized latent using a second neural network to produce an output image, wherein the output image is an approximation of the input training image; evaluating a loss function based on differences between the output image and the input training image; evaluating a gradient of the loss function; back-propagating the gradient of the loss function through the first neural network and the second neural network to update the parameters of the first neural network and the second neural network; and repeating the above steps using a first set of training images to produce a first trained neural network and a second trained neural network; wherein the differences between the output image and the input training image is determined based on the output of a neural network acting as a discriminator; the neural network acting as a discriminator receives an additional input; the additional input is based on an output of an intermediate layer of the first neural network or the second neural network; and back-propagation of the gradient of the loss function is additionally used to update the parameters of the neural network acting as a discriminator.

According to the present disclosure there is provided a method of training one or more neural networks, the one or more neural networks being for use in lossy image or video encoding, transmission and decoding, the method comprising the steps of: receiving a first input training image; encoding the first input training image using a first neural network to produce a latent representation; performing a quantization process on the latent representation to produce a quantized latent; decoding the quantized latent using a second neural network to produce an output image, wherein the output image is an approximation of the input training image; evaluating a loss function based on differences between the output image and the input training image and the rate of the quantized latent; evaluating a gradient of the loss function; back-propagating the gradient of the loss function through the first neural network and the second neural network to update the parameters of the first neural network and the second neural network; and repeating the above steps using a first set of training images to produce a first trained neural network and a second trained neural network; wherein the differences between the output image and the input training image is determined based on the output of a neural network acting as a discriminator; the neural network acting as a discriminator receives an additional input; the additional input is the rate of the quantized latent; and back-propagation of the gradient of the loss function is additionally used to update the parameters of the neural network acting as a discriminator.

The neural network acting as a discriminator may provide a first output using the input training image as an input and a second output using the output image as an input; and the additional input may be used as an input when generating each of the first output and the second output.

The neural network acting as a discriminator may receive an input in which the additional input is channel concatenated with the input training image or the output image.

The parameters of the neural network acting as a discriminator may be determined by the output of a fourth neural network that receives the additional input as an input.

According to the present disclosure there is provided a method of training one or more neural networks, the one or more neural networks being for use in lossy image or video encoding, transmission and decoding, the method comprising the steps of: receiving a first input training image; encoding the first input training image using a first neural network to produce a latent representation; performing a quantization process on the latent representation to produce a quantized latent; decoding the quantized latent using a second neural network to produce an output image, wherein the output image is an approximation of the input training image; evaluating a loss function based on differences between the output image and the input training image; evaluating a gradient of the loss function; back-propagating the gradient of the loss function through the first neural network and the second neural network to update the parameters of the first neural network and the second neural network; and repeating the above steps using a first set of training images to produce a first trained neural network and a second trained neural network; wherein the differences between the output image and the input training image are determined based on the output of a plurality of neural networks each acting as a discriminator, wherein the best performing discriminator is selected to perform the determination; and back-propagation of the gradient of the loss function is additionally used to update the parameters of each of the plurality of neural networks acting as a discriminator.

The best performing discriminator may be selected based on either a minimal or maximal objective score.

According to the present disclosure there is provided a method for lossy image or video encoding, transmission and decoding, the method comprising the steps of: receiving an input image at a first computer system; encoding the first input training image using a first trained neural network to produce a latent representation; performing a quantization process on the latent representation to produce a quantized latent; transmitting the quantized latent to a second computer system; and decoding the quantized latent using a second trained neural network to produce an output image, wherein the output image is an approximation of the input training image; wherein the first trained neural network and the second trained neural network have been trained according to the methods of training one or more neural networks above.

According to the present disclosure there is provided a method for lossy image or video encoding and transmission, the method comprising the steps of: receiving an input image at a first computer system; encoding the first input training image using a first trained neural network to produce a latent representation; performing a quantization process on the latent representation to produce a quantized latent; transmitting the quantized latent; wherein the first trained neural network has been trained according to the methods of training one or more neural networks above.

According to the present disclosure there is provided a method for lossy image or video receipt and decoding, the method comprising the steps of: receiving the quantized latent according to the method for lossy image or video encoding and transmission above at a second computer system; and decoding the quantized latent using a second trained neural network to produce an output image, wherein the output image is an approximation of the input training image; wherein the second trained neural network has been trained according to the methods of training one or more neural networks above.

According to the present disclosure there is provided a data processing system configured to perform the methods of training one or more neural networks above.

According to the present disclosure there is provided a data processing apparatus configured to perform the method for lossy image or video encoding and transmission or for lossy image or video receipt and decoding above.

According to the present disclosure there is provided a computer program comprising instructions which, when the program is executed by a computer, cause the computer to carry out the method for lossy image or video encoding and transmission or for lossy image or video receipt and decoding above.

According to the present disclosure there is provided a computer-readable storage medium comprising instructions which, when executed by a computer, cause the computer to carry out the method for lossy image or video encoding and transmission or for lossy image or video receipt and decoding above.

According to the present disclosure there is provided a method of training one or more neural networks, the one or more neural networks being for use in lossy image or video encoding, transmission and decoding, the method comprising the steps of: receiving, encoding, transmitting and decoding a first input training image to produce an output image using the one or more neural networks, wherein the output image is an approximation of the input training image; updating the parameters of the one or more neural networks based on differences between the output image and the input image; and repeating the above steps using a first set of training images to produce one or more trained neural networks; wherein the differences between the output image and the input training image are determined based on the output of a neural network acting as a discriminator; the neural network acting as a discriminator comprises a convolutional layer; the convolutional layer comprises a first convolutional filter, wherein the norm of the first convolutional filter is set to a predetermined value greater than or less than one; and the differences between the output image and the input training image are additionally used to update the parameters of the neural network acting as a discriminator.

The neural network acting as a discriminator may comprise a further convolutional layer comprising a second convolutional filter; wherein the norm of the second convolutional filter is set to a predetermined value greater than or less than one and different to the norm of the first convolutional filter.

The predetermined values of the one or more convolutional filters may be hyperparameters of the neural network acting as a discriminator.

The encoding of the first input training image may be performed using a first neural network to produce a latent representation; a quantization process may be performed on the latent representation to produce a quantized latent; and the decoding may be performed by decoding the quantized latent using a second neural network to produce the output image.

According to the present disclosure there is provided a method of training one or more neural networks, the one or more neural networks being for use in lossy image or video encoding, transmission and decoding, the method comprising the steps of: receiving a first input training image; encoding the first input training image using a first neural network to produce a latent representation; performing a quantization process on the latent representation to produce a quantized latent; decoding the quantized latent using a second neural network to produce an output image, wherein the output image is an approximation of the input training image; evaluating a loss function based on differences between the output image and the input training image; evaluating a gradient of the loss function; back-propagating the gradient of the loss function through the first neural network and the second neural network to update the parameters of the first neural network and the second neural network; and repeating the above steps using a first set of training images to produce a first trained neural network and a second trained neural network; wherein the differences between the output image and the input training image is determined based on the output of a neural network acting as a discriminator; the loss function comprises a penalty term based on a norm associated with the neural network acting as a discriminator; and back-propagation of the gradient of the loss function is additionally used to update the parameters of the neural network acting as a discriminator.

The norm may be based on a norm of the Jacobian of the output of the neural network acting as a discriminator.

The norm may be the Frobenius norm of the Jacobian.

The neural network acting as a discriminator may be a patch discriminator; and the penalty term based on a norm may be based on a sum of the norms associated with each patch of the patch discriminator.

The Frobenius norm of the Jacobian may be calculated using a set of randomly sampled vectors.

The vectors may be sampled from a normal distribution.

The number of randomly sampled vectors may be 1.

The Frobenius norm of the Jacobian may be calculated using the vector-Jacobian product.

The Frobenius norm of the Jacobian may be calculated using a finite difference method.

According to the present disclosure there is provided a method for lossy image or video encoding, transmission and decoding, the method comprising the steps of: receiving an input image at a first computer system; encoding the first input training image using a first trained neural network to produce a latent representation; performing a quantization process on the latent representation to produce a quantized latent; transmitting the quantized latent to a second computer system; and decoding the quantized latent using a second trained neural network to produce an output image, wherein the output image is an approximation of the input training image; wherein the first trained neural network and the second trained neural network have been trained according to the methods of training one or more neural networks above. According to the present disclosure there is provided a method for lossy image or video encoding and transmission, the method comprising the steps of: receiving an input image at a first computer system; encoding the first input training image using a first trained neural network to produce a latent representation; performing a quantization process on the latent representation to produce a quantized latent; transmitting the quantized latent; wherein the first trained neural network has been trained according to the methods of training one or more neural networks above.

According to the present disclosure there is provided a method for lossy image or video receipt and decoding, the method comprising the steps of: receiving the quantized latent according to the method for lossy image or video encoding and transmission above at a second computer system; and decoding the quantized latent using a second trained neural network to produce an output image, wherein the output image is an approximation of the input training image; wherein the second trained neural network has been trained according to the methods of training one or more neural networks above.

According to the present disclosure there is provided a data processing system configured to perform the methods of training one or more neural networks above.

According to the present disclosure there is provided a data processing apparatus configured to perform the method for lossy image or video encoding and transmission or for lossy image or video receipt and decoding above.

According to the present disclosure there is provided a computer program comprising instructions which, when the program is executed by a computer, cause the computer to carry out the method for lossy image or video encoding and transmission or for lossy image or video receipt and decoding above.

According to the present disclosure there is provided a computer-readable storage medium comprising instructions which, when executed by a computer, cause the computer to carry out the method for lossy image or video encoding and transmission or for lossy image or video receipt and decoding above.

BRIEF DESCRIPTION OF THE DRAWINGS

Aspects of the disclosure will now be described by way of examples, with reference to the following figures in which.

DETAILED DESCRIPTION

Figure 1:
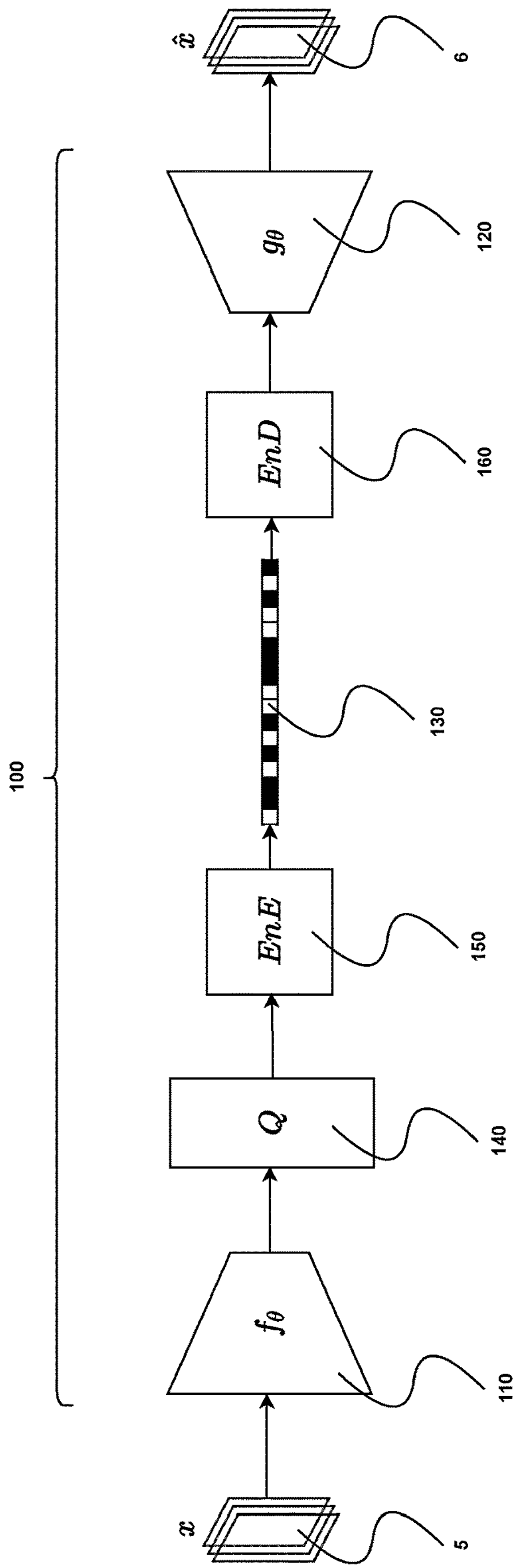
FIG. 1 illustrates an example of an image or video compression, transmission and decompression pipeline.

Compression processes may be applied to any form of information to reduce the amount of data, or file size, required to store that information. Image and video information is an example of information that may be compressed. The file size required to store the information, particularly during a compression process when referring to the compressed file, may be referred to as the rate. In general, compression can be lossless or lossy. In both forms of compression, the file size is reduced. However, in lossless compression, no information is lost when the information is compressed and subsequently decompressed. This means that the original file storing the information is fully reconstructed during the decompression process. In contrast to this, in lossy compression information may be lost in the compression and decompression process and the reconstructed file may differ from the original file. Image and video files containing image and video data are common targets for compression. JPEG, JPEG2000, AVC, HEVC and AVI are examples of compression processes for image and/or video files.

In a compression process involving an image, the input image may be represented as x. The data representing the image may be stored in a tensor of dimensions H×W×C, where H represents the height of the image, W represents the width of the image and C represents the number of channels of the image. Each H×W data point of the image represents a pixel value of the image at the corresponding location. Each channel C of the image represents a different component of the image for each pixel which are combined when the image file is displayed by a device. For example, an image file may have 3 channels with the channels representing the red, green and blue component of the image respectively. In this case, the image information is stored in the RGB color space, which may also be referred to as a model or a format. Other examples of color spaces or formats include the CMKY and the YCbCr color models. However, the channels of an image file are not limited to storing color information and other information may be represented in the channels. As a video may be considered a series of images in sequence, any compression process that may be applied to an image may also be applied to a video. Each image making up a video may be referred to as a frame of the video.

The output image may differ from the input image and may be represented by. The difference between the input image and the output image may be referred to as distortion or a difference in image quality. The distortion can be measured using any distortion function which receives the input image and the output image and provides an output which represents the difference between input image and the output image in a numerical way. An example of such a method is using the mean square error (MSE) between the pixels of the input image and the output image, but there are many other ways of measuring distortion, as will be known to the person skilled in the art. The distortion function may comprise a trained neural network.

Typically, the rate and distortion of a lossy compression process are related. An increase in the rate may result in a decrease in the distortion, and a decrease in the rate may result in an increase in the distortion. Changes to the distortion may affect the rate in a corresponding manner. A relation between these quantities for a given compression technique may be defined by a rate-distortion equation.

AI based compression processes may involve the use of neural networks. A neural network is an operation that can be performed on an input to produce an output. A neural network may be made up of a plurality of layers. The first layer of the network receives the input. One or more operations may be performed on the input by the layer to produce an output of the first layer. The output of the first layer is then passed to the next layer of the network which may perform one or more operations in a similar way. The output of the final layer is the output of the neural network.

Each layer of the neural network may be divided into nodes. Each node may receive at least part of the input from the previous layer and provide an output to one or more nodes in a subsequent layer. Each node of a layer may perform the one or more operations of the layer on at least part of the input to the layer. For example, a node may receive an input from one or more nodes of the previous layer. The one or more operations may include a convolution, a weight, a bias and an activation function. Convolution operations are used in convolutional neural networks. When a convolution operation is present, the convolution may be performed across the entire input to a layer. Alternatively, the convolution may be performed on at least part of the input to the layer.

Each of the one or more operations is defined by one or more parameters that are associated with each operation. For example, the weight operation may be defined by a weight matrix defining the weight to be applied to each input from each node in the previous layer to each node in the present layer. In this example, each of the values in the weight matrix is a parameter of the neural network. The convolution may be defined by a convolution matrix, also known as a kernel. In this example, one or more of the values in the convolution matrix may be a parameter of the neural network. The activation function may also be defined by values which may be parameters of the neural network. The parameters of the network may be varied during training of the network.

Other features of the neural network may be predetermined and therefore not varied during training of the network. For example, the number of layers of the network, the number of nodes of the network, the one or more operations performed in each layer and the connections between the layers may be predetermined and therefore fixed before the training process takes place. These features that are predetermined may be referred to as the hyperparameters of the network. These features are sometimes referred to as the architecture of the network.

To train the neural network, a training set of inputs may be used for which the expected output, sometimes referred to as the ground truth, is known. The initial parameters of the neural network are randomized and the first training input is provided to the network. The output of the network is compared to the expected output, and based on a difference between the output and the expected output the parameters of the network are varied such that the difference between the output of the network and the expected output is reduced. This process is then repeated for a plurality of training inputs to train the network. The difference between the output of the network and the expected output may be defined by a loss function. The result of the loss function may be calculated using the difference between the output of the network and the expected output to determine the gradient of the loss function. Back-propagation of the gradient descent of the loss function may be used to update the parameters of the neural network using the gradients dL/dy of the loss function. A plurality of neural networks in a system may be trained simultaneously through back-propagation of the gradient of the loss function to each network.

In the case of AI based image or video compression, the loss function may be defined by the rate distortion equation. The rate distortion equation may be represented by $Loss=D+\lambda*R$, where D is the distortion function, $\lambda$ is a weighting factor, and R is the rate loss. A may be referred to as a lagrange multiplier. The langrange multiplier provides as weight for a particular term of the loss function in relation to each other term and can be used to control which terms of the loss function are favored when training the network.

In the case of AI based image or video compression, a training set of input images may be used. An example training set of input images is the KODAK image set (for example at www.cs.albany.edu/~xypan/research/snr/Kodak.html). An example training set of input images is the IMAX image set. An example training set of input images is the Imagenet dataset (for example at www.image-net.org/download). An example training set of input images is the CLIC Training Dataset P ("professional") and M ("mobile") (for example at http://challenge.compression.cc/tasks/).

An example of an AI based compression, transmission and decompression process 100 is shown in FIG. 1. As a first step in the AI based compression process, an input image 5 is provided. The input image 5 is provided to a trained neural network 110 characterized by a function $f_\theta$ acting as an encoder. The encoder neural network 110 produces an output based on the input image. This output is referred to as a latent representation of the input image 5. In a second step, the latent representation is quantized in a quantization process 140 characterized by the operation Q, resulting in a quantized latent. The quantization process transforms the continuous latent representation into a discrete quantized latent. An example of a quantization process is a rounding function.

In a third step, the quantized latent is entropy encoded in an entropy encoding process 150 to produce a bitstream 130. The entropy encoding process may be for example, range or arithmetic encoding. In a fourth step, the bitstream 130 may be transmitted across a communication network.

In a fifth step, the bitstream is entropy decoded in an entropy decoding process 160. The quantized latent is provided to another trained neural network 120 characterized by a function $g_\theta$ acting as a decoder, which decodes the quantized latent. The trained neural network 120 produces an output based on the quantized latent. The output may be the output image of the AI based compression process 100. The encoder-decoder system may be referred to as an autoencoder.

The system described above may be distributed across multiple locations and/or devices. For example, the encoder 110 may be located on a device such as a laptop computer, desktop computer, smart phone or server. The decoder 120 may be located on a separate device which may be referred to as a recipient device. The system used to encode, transmit and decode the input image 5 to obtain the output image 6 may be referred to as a compression pipeline.

The AI based compression process may further comprise a hyper-network 105 for the transmission of meta-information that improves the compression process. The hyper-network 105 comprises a trained neural network 115 acting as a hyper-encoder $$f_\theta^h$$

and a trained neural network 125 acting as a hyper-decoder $$g_\theta^h.$$

Figure 2:
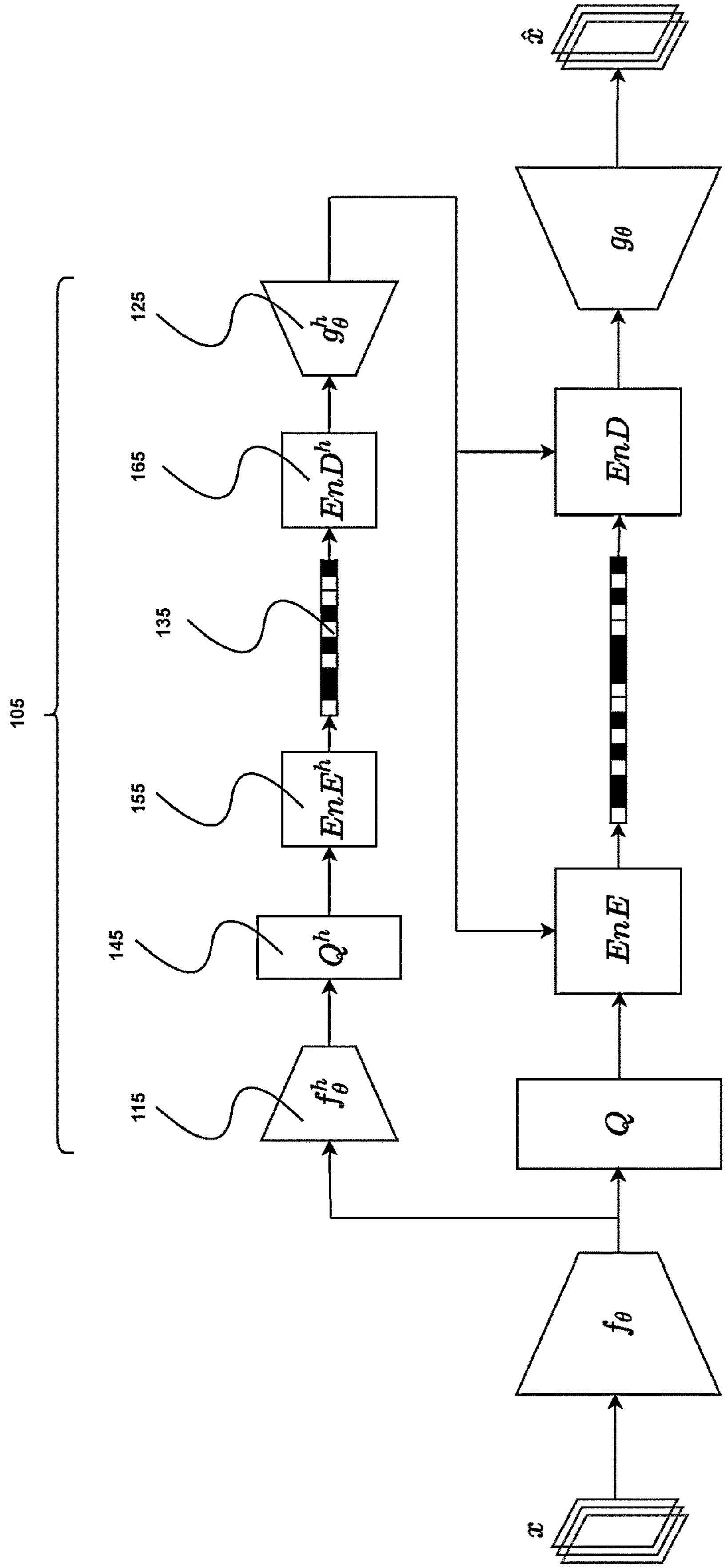
FIG. 2 illustrates a further example of an image or video compression, transmission and decompression pipeline including a hyper-network.

An example of such a system is shown in FIG. 2. Components of the system not further discussed may be assumed to be the same as discussed above. The neural network 115 acting as a hyper-decoder receives the latent that is the output of the encoder 110. The hyper-encoder 115 produces an output based on the latent representation that may be referred to as a hyper-latent representation. The hyper-latent is then quantized in a quantization process 145 characterized by $Q^h$ to produce a quantized hyper-latent. The quantization process 145 characterised by $Q^h$ may be the same as the quantisation process 140 characterised by Q discussed above.

In a similar manner as discussed above for the quantized latent, the quantized hyper-latent is then entropy encoded in an entropy encoding process 155 to produce a bitstream 135. The bitstream 135 may be entropy decoded in an entropy decoding process 165 to retrieve the quantized hyper-latent. The quantized hyper-latent is then used as an input to trained neural network 125 acting as a hyper-decoder. However, in contrast to the compression pipeline 100, the output of the hyper-decoder may not be an approximation of the input to the hyper-decoder 115. Instead, the output of the hyper-decoder is used to provide parameters for use in the entropy encoding process 150 and entropy decoding process 160 in the main compression process 100. For example, the output of the hyper-decoder 125 can include one or more of the mean, standard deviation, variance or any other parameter used to describe a probability model for the entropy encoding process 150 and entropy decoding process 160 of the latent representation. In the example shown in FIG. 2, only a single entropy decoding process 165 and hyper-decoder 125 is shown for simplicity. However, in practice, as the decompression process usually takes place on a separate device, duplicates of these processes will be present on the device used for encoding to provide the parameters to be used in the entropy encoding process 150.

Further transformations may be applied to at least one of the latent and the hyper-latent at any stage in the AI based compression process 100. For example, at least one of the latent and the hyper latent may be converted to a residual value before the entropy encoding process 150,155 is performed. The residual value may be determined by subtracting the mean value of the distribution of latents or hyper-latents from each latent or hyper latent. The residual values may also be normalized.

To perform training of the AI based compression process described above, a training set of input images may be used as described above. During the training process, the parameters of both the encoder 110 and the decoder 120 may be simultaneously updated in each training step. If a hyper-network 105 is also present, the parameters of both the hyper-encoder 115 and the hyper-decoder 125 may additionally be simultaneously updated in each training step.

The training process may further include a generative adversarial network (GAN). When applied to an AI based compression process, in addition to the compression pipeline described above, an additional neutral network acting as a discriminator is included in the system. The discriminator receives an input and outputs a score based on the input providing an indication of whether the discriminator considers the input to be ground truth or fake. For example, the indicator may be a score, with a high score associated with a ground truth input and a low score associated with a fake input. For training of a discriminator, a loss function is used that maximizes the difference in the output indication between an input ground truth and input fake.

When a GAN is incorporated into the training of the compression process, the output image 6 may be provided to the discriminator. The output of the discriminator may then be used in the loss function of the compression process as a measure of the distortion of the compression process. Alternatively, the discriminator may receive both the input image 5 and the output image 6 and the difference in output indication may then be used in the loss function of the compression process as a measure of the distortion of the compression process. Training of the neural network acting as a discriminator and the other neutral networks in the compression process may be performed simultaneously. During use of the trained compression pipeline for the compression and transmission of images or video, the discriminator neural network is removed from the system and the output of the compression pipeline is the output image 6.

Incorporation of a GAN into the training process may cause the decoder 120 to perform hallucination. Hallucination is the process of adding information in the output image 6 that was not present in the input image 5. In an example, hallucination may add fine detail to the output image 6 that was not present in the input image 5 or received by the decoder 120. The hallucination performed may be based on information in the quantized latent received by decoder 120.

As discussed above, a video is made up of a series of images arranged in sequential order. AI based compression process 100 described above may be applied multiple times to perform compression, transmission and decompression of a video. For example, each frame of the video may be compressed, transmitted and decompressed individually. The received frames may then be grouped to obtain the original video.

A number of concepts related to the AI compression processes and/or their implementation in a hardware system discussed above will now be described. Although each concept is described separately, one or more of the concepts described below may be applied in an AI based compression process as described above.

Diffusion Decoders

Diffusion models are a class of generative model, where in the training process, we incrementally add noise to a sample/image, and learn a function (the denoising function), that learns to remove this noise. In the reverse/generative process, we denoise that sample, starting from a sample of a standard normal. Some aspects of diffusion models will not be discussed in detail, such as the forward process or the sampling process, as these are explained in "Jonathan Ho, Ajay Jain, and Pieter Abbeel. Denoising diffusion probabilistic models. arXiv preprint arXiv:2006.11239, 2020" and "Chitwan Saharia, Jonathan Ho, William Chan, Tim Salimans, David J Fleet, and Mohammad Norouzi. Image super-resolution via iterative refinement. arXiv preprint arXiv: 2104.07636, 2021" which are hereby incorporated by reference, The application of diffusion models to an AI based compression pipeline as discussed above is set out below.

The decoder in the encoder-decoder pipeline as discussed above may be replaced with a conditional diffusion decoder (CDD). An example of a CDD is described in "Chitwan Saharia, Jonathan Ho, William Chan, Tim Salimans, David J Fleet, and Mohammad Norouzi. Image super-resolution via iterative refinement. arXiv preprint arXiv:2104.07636, 2021". The aim of the CCD when applied in an AI based compression pipeline is to reconstruct the input image given the quantized latents over some number of timesteps T, starting from a random sample. The random sample may be a sample from a standard normal. When applied in an AI based compression pipeline, the random sample may be additionally conditioned with the received latent representation. This is done through iteratively removing noise from the previous sample $x_t$ to get $x_{t-1}$ until we reach $x_0$, which is our image to be decoded. In an example, the initial input to the CCD is a sample from a standard normal, which may be further conditioned with the latent representation. The latent representation may be upsampled prior to being used to condition the CCD.

Figure 6:
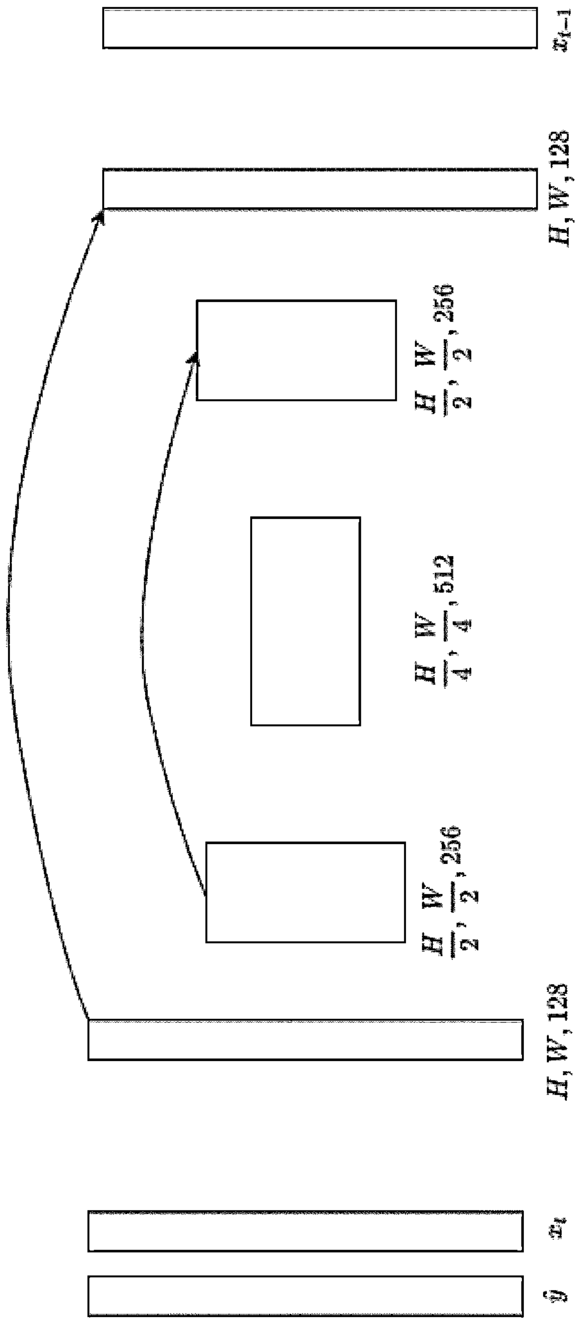
FIG. 6 illustrates an example architecture of a denoising model.
Figure 7:
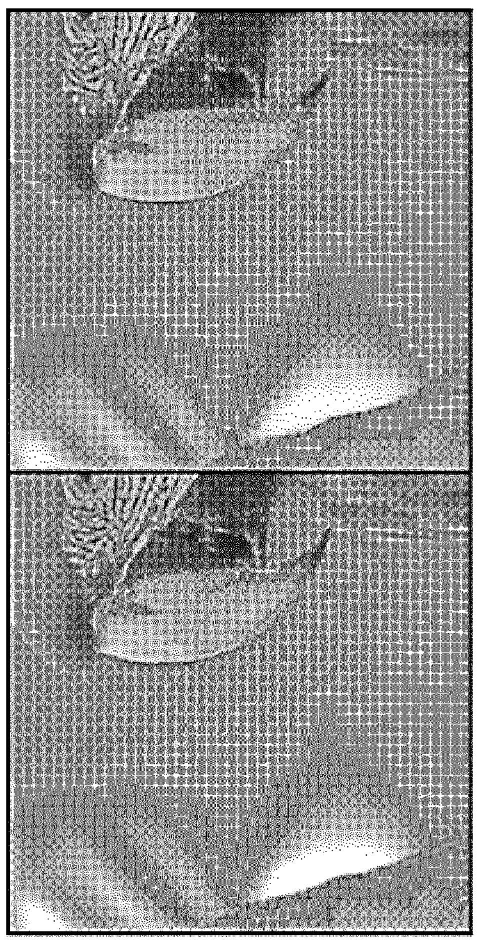
FIGS. 7 to 10 illustrate examples of decoded images using the CCD pipeline.
Figure 8:
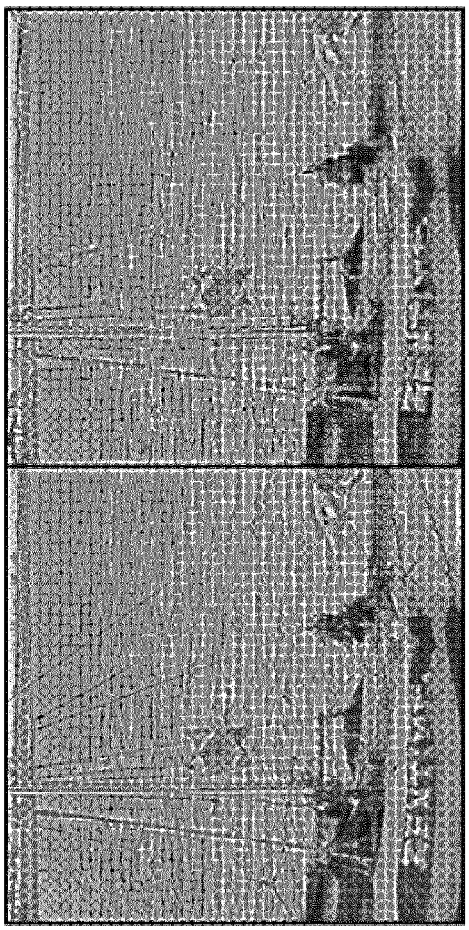
Figure 9:
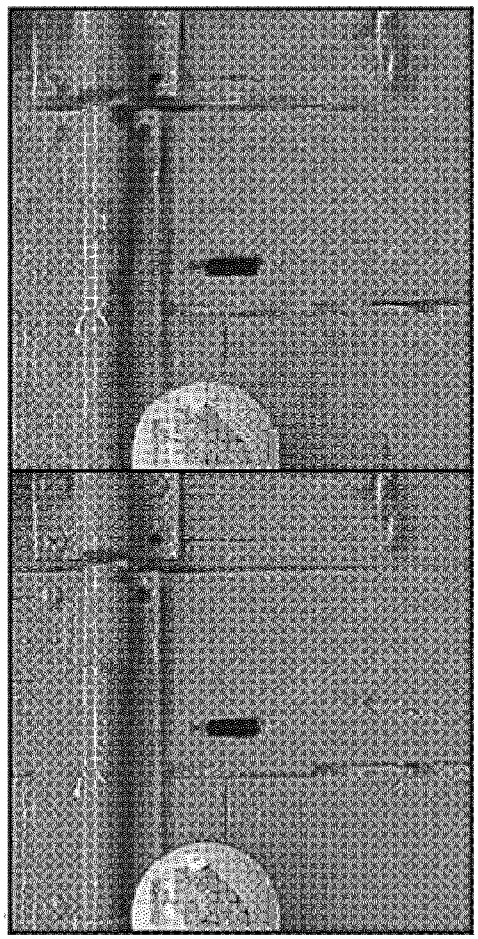
Figure 10:
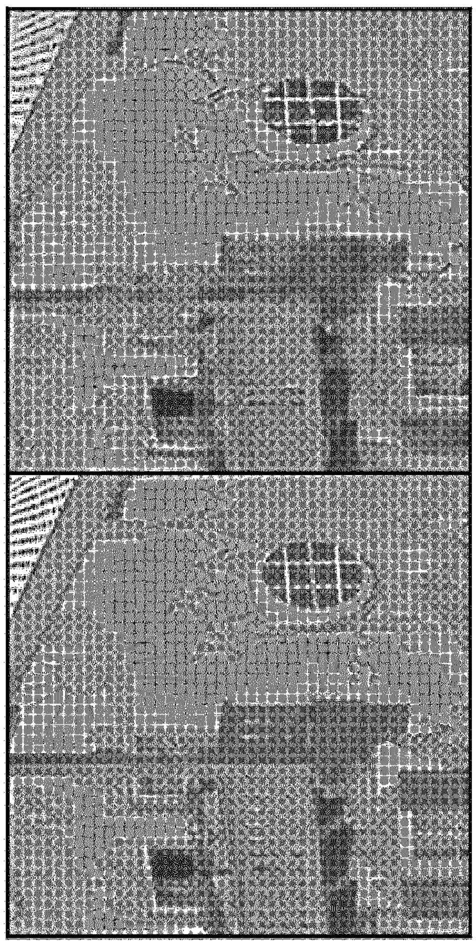

Until the decoder, the architecture of the system may be the same as the AI compression pipeline discussed above. There are no limitations on the entropy module or the addition of hyper and context modules to the entropy module. After the y latent is quantised, the architecture is different. In the first layer of the decoder, the CCD, we upsample (Nearest neighbour) our quantised latent space to the image scale as our conditional diffusion decoder (CDD) operates in the image resolution. This upsampled quantised latent is then used to condition the CCD noise input $x_t$. An example architecture is shown in FIG. 6.

Figure 3:
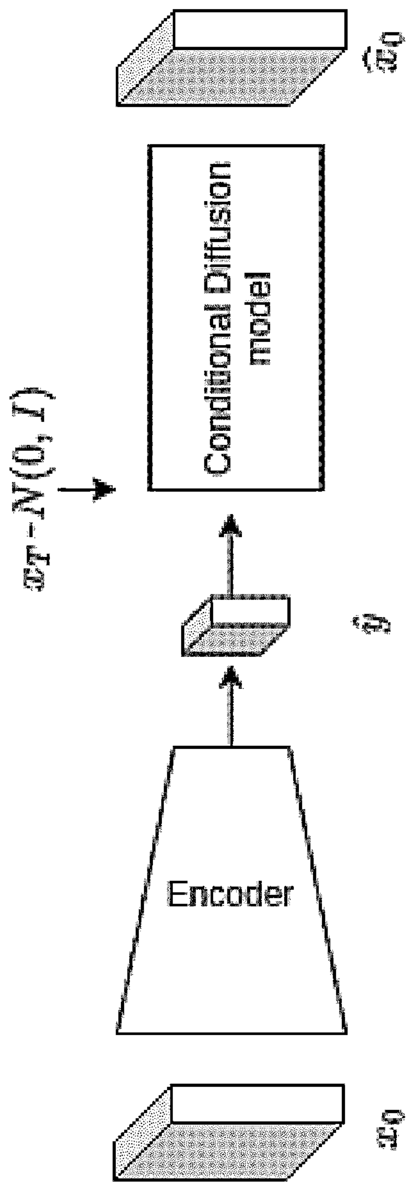
FIG. 3 illustrates a pipeline for AI based compression using conditional denoising decoders (CDDs). $x_0$ represents the image to be encoded, $x_0$ represents the reconstructed image, and $\overline{y}$ is the quantised latent space.

The training function may have two components. The first is the standard rate loss as discussed above, and the second is a loss for the denoising function, called the denoising loss. The aim of the rate is to minimize the number of bits required to encode y, and the aim of the denoising loss is to learn a function that can predict the noise that was added to a sample. The training or loss function may additionally include a distortion loss as discussed above. In the case where the distortion loss is not used, the gradients used to update the parameters of the encoder now come from the denoising loss. This provides the denosing function with an informative conditioned latent to reconstruct $\hat{x}_0$. Algorithm 1 shows an example of the training process in detail and FIG. 3 shows an example of the entire pipeline.

Algorithm 1 Example algorithm for a single training step for a conditional diffusion decoder for compression. $x_0$ is the current sample, and during training we iterate through N images where N is the size of our training dataset Inputs:
- Input image: $x_0$
- Encoder network: $E_\phi$
- Decoder network: $D_\phi$
- Denoising function: $g_\theta$
- Optimizer encoder decoder: $opt_\phi$
- Variance schedule: $\beta_{1 \ldots T}$ $$\alpha_t = \sqrt{1-\beta_t}$$

$$\overline{\alpha}_t = \prod_{s=1}^{t} \alpha_s$$

Rate loss calculation:
- $y \leftarrow Encoders_\phi\ (x)$
- $\hat{y} \leftarrow Quantise(y)$
- $\mathcal{L}_{rate} \leftarrow Rate(\hat{y})$ Diffusion loss calculation:
- $t \sim U(0, T)$ $$\overline{\alpha}_t \leftarrow \prod_{s=1}^{t} \alpha_s$$

$$\epsilon \sim N(0, 1)$$

$$x_t \leftarrow \sqrt{\overline{\alpha}}\, x_0 + \sqrt{1-\overline{\alpha}}$$

$$\epsilon_\theta \leftarrow g_\theta(x_T, \hat{y}, t)$$

$$\mathcal{L}_{diffusion} \leftarrow \|\epsilon_\theta - \epsilon\|_2^2$$

Distortion loss calculation:
- $\hat{x}_0 \leftarrow Decoder(\hat{y})$
- $\mathcal{L}_{MSE} \leftarrow ||\hat{x}_0 - x_0||$ Optimization:
- $\mathcal{L}_{total} \leftarrow \mathcal{L}_{MSE} + \mathcal{L}_{rate} + \mathcal{L}_{diffusion}$
- backpropagate($\mathcal{L}_{total}$)
- step($opt_\phi$)

Figure 4:
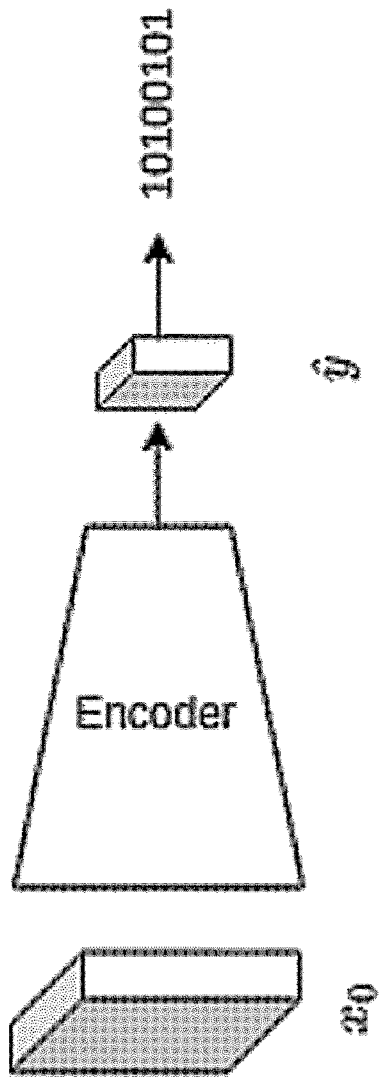
FIG. 4 illustrates an encoding pipeline. $\hat{x}_0$ represents the image to be encoded, and $\hat{y}$ is the quantised latent space.

The encoding process may be the same as discussed above, but the trained parameters of the encoder will differ due to the inclusion of the CDD as a decoder. FIG. 4 shows the encoding process.

Figure 5:
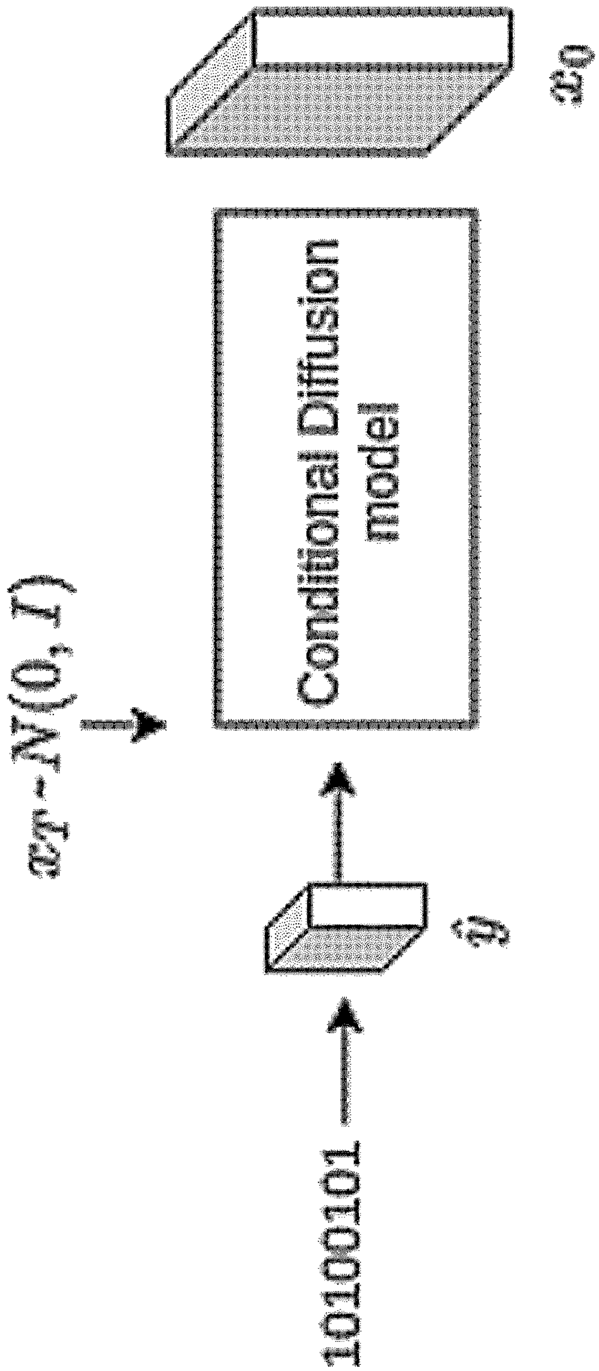
FIG. 5 illustrates a decoding pipeline. 2*o* represents the reconstructed image, and $\hat{y}$ is the quantised latent space.

For decoding, after the $\hat{y}$ is recovered from the bitstream using arithmetic decoding, we sample an $\in$ from a standard normal for the first T, $x_T$, and perform the computation of the reverse pass as shown in Algorithm 2 for T number of steps to get out final output $\hat{x}_0$, where each step gets us closer to T=0. FIG. 5 also shows this process (without the iterative structure).

Furthermore, some decoded images using the CDD method are also shown in FIG. 7 to FIG. 10. We note that this model did not have the optional distortion penalty applied to it.

Algorithm 2 Example algorithm for decoding using conditional diffusion decoder for compression. BS is the bitstream received, which is decoded using an arithmetic decoder to get $\hat{y}$. Following from this, we sample a noise from a standard normal, condition on $\hat{y}$, and iteratively denoising using the learnt denoising function to get $x_0$ Inputs:
- Received bitstream: BS
- Decoder network: $D_\phi$
- Arithmetic decoder: AD
- Denoising function: $g_\theta$
- Variance schedule: $\beta_{1 \ldots T}$
- $\alpha_t = \sqrt{1-\beta_t}$ Reverse sampling:
- $\hat{y} \leftarrow AD(BS)$
- $x_T \sim N(0, I)$
- for t = T . . . 1
- z ~ N(0, I)

$$\bar{\alpha}_t \leftarrow \prod_{s=1}^{t} \alpha_s$$

$$\bar{\alpha}_{t-1} \leftarrow \prod_{s=1}^{t-1} \alpha_s$$

$$\alpha_t = \sqrt{1-\beta_t}$$

$$\hat{x}_0 \leftarrow \left(x_t - \sqrt{1-\alpha_t}\, g_\theta(x_t, \hat{y}, t)\right)\frac{1}{\sqrt{\alpha_t}}$$

$$\tilde{\mu}_{t-1|t} = \frac{\sqrt{\alpha_t}\,(1-\bar{\alpha}_t)}{1-\bar{\alpha}_t}x_t + \frac{\sqrt{\bar{\alpha}_{t-1}}\,\beta_t}{1-\bar{\alpha}_t}\hat{x}_0$$

$$\tilde{\beta}_{t-1|t} = \frac{1-\bar{\alpha}_{t-1}}{1-\bar{\alpha}_t}\beta_t$$

$$x_{t-1} = \tilde{\mu}_{t-1|t} + \sqrt{\tilde{\beta}_{t-1|t}}\, z$$

Output:
- Decoded image: $\hat{x}_0$

Resampling Patches

Despite the outstanding success of neural image compression models, the rate-distortion loss may not always be enough to effectively reconstruct regions of particular modes, such as faces and texts. To this end, adding a generative adversarial loss to the distortion term has been shown to work well in improving the reconstruction of these modes. However, there is still a prevalent failure in learning to reconstruct these modes to a suitable degree. Discussed below is a method which may take advantage of the saliency learned by the discriminator that detects patches of the image comprising some of these difficult modes. The traditional training regime may be augmented by using the resulting saliency map to crop the difficult-to-learn parts of an image and iterate over them. The crop of an image may be referred to as a sub-image. A patch of the image may be made up of one or more sub-images. The saliency of a region or sub-image of an image may be defined as the level of importance or prominence of that region or sub-image compared to other region or sub-images of the image to a human observer.

We briefly describe the loss function which may be used in our pipeline in further detail. Let x denote the input image to be compressed, $\hat{y}$ the quantized latent produced by our encoder, and $\hat{x}$ the reconstruction. The rate-distortion (RD) loss for our neural image compression pipeline can be expressed as:

$$RD := \underbrace{\mathbb{E}_{\hat{y}}\left[\left(-\log_2\left(p_{\hat{y}}(\hat{y})\right)\right)\right]}_{rate} + \underbrace{MSE(x, \hat{x}) + LPIPS(x, \hat{x})}_{distortion} \quad (1)$$

where MSE is the pixel-wise mean-squared error and LPIPS is a feature-based loss using a pretrained classification network.

We may add a non-saturating generative loss to act as a perceptual loss, resulting in the following rate-distortion-perception (RDP) loss:

$$RDP = RD + \mathbb{E}_{\hat{x}\sim q(x)}[-\log(D(\hat{x}))] \quad (2)$$

where the discriminator D is neural network trained to assess whether patches from the image are sampled from the real distribution or the generated distribution by assigning a patch a value between 0 (fake) and 1 (real). D may be trained in tandem with the generator in a minimax game using a binary cross-entropy loss.

Figure 11:
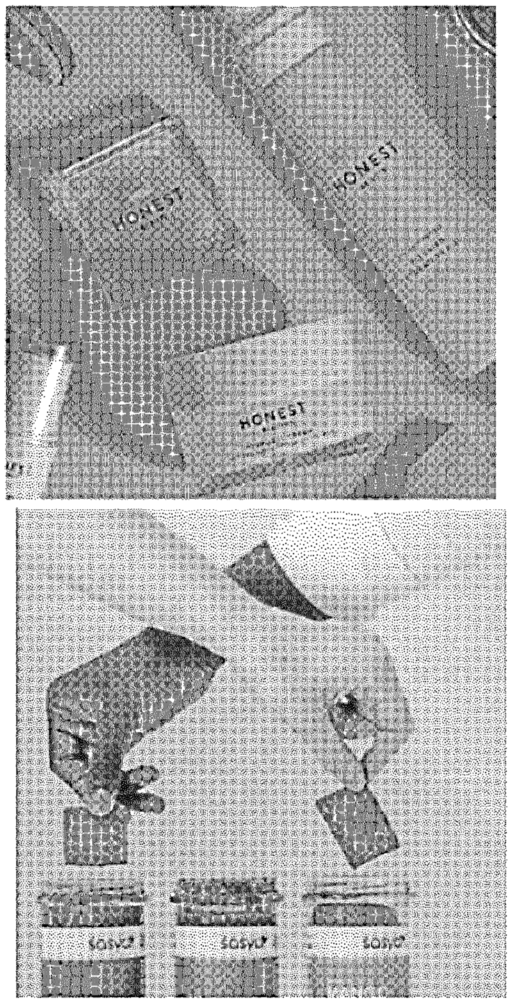
FIG. 11 illustrates an example of an input image.
Figure 12:
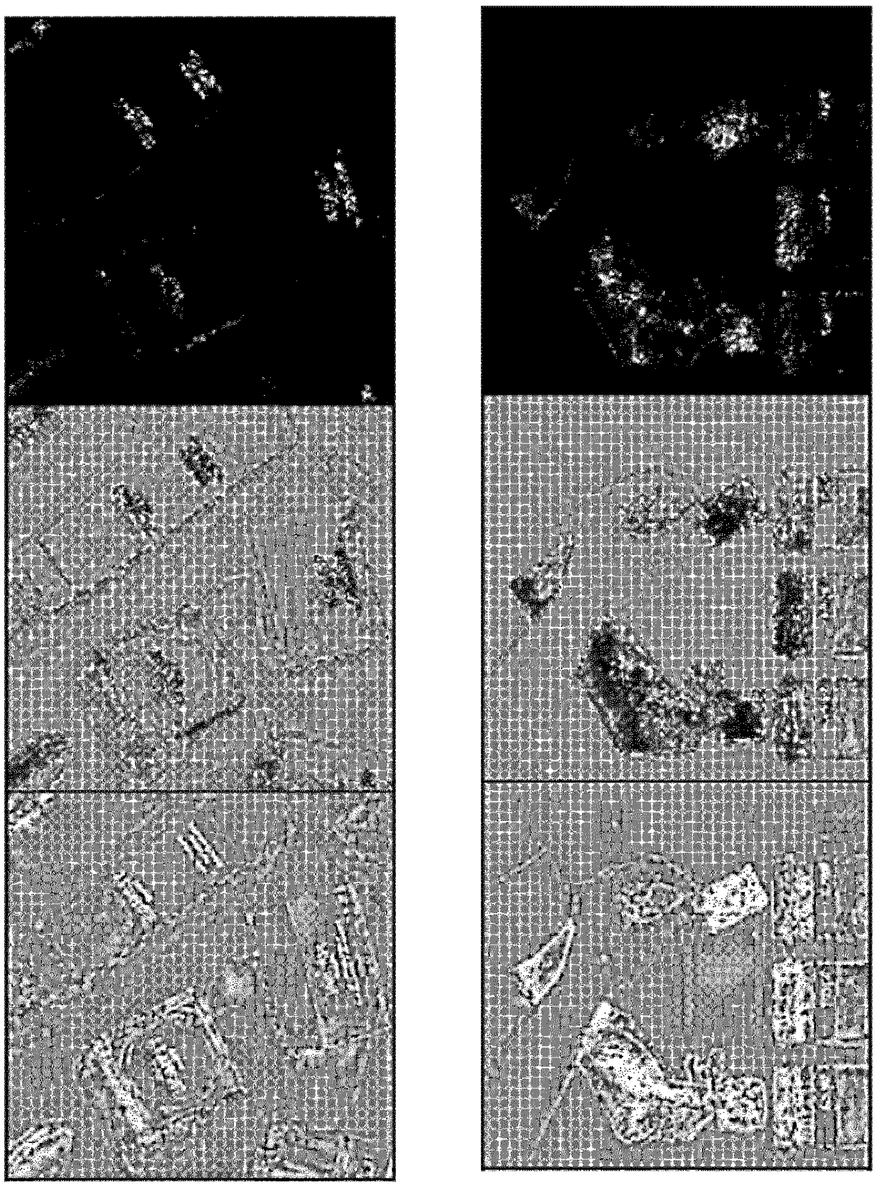
FIG. 12 illustrates on the left an example of a discriminator applied to the example input image of FIG. 11, in the center an example of the discriminator applied to a predicted image and on the right and example of a probability mass function.
Figure 13:
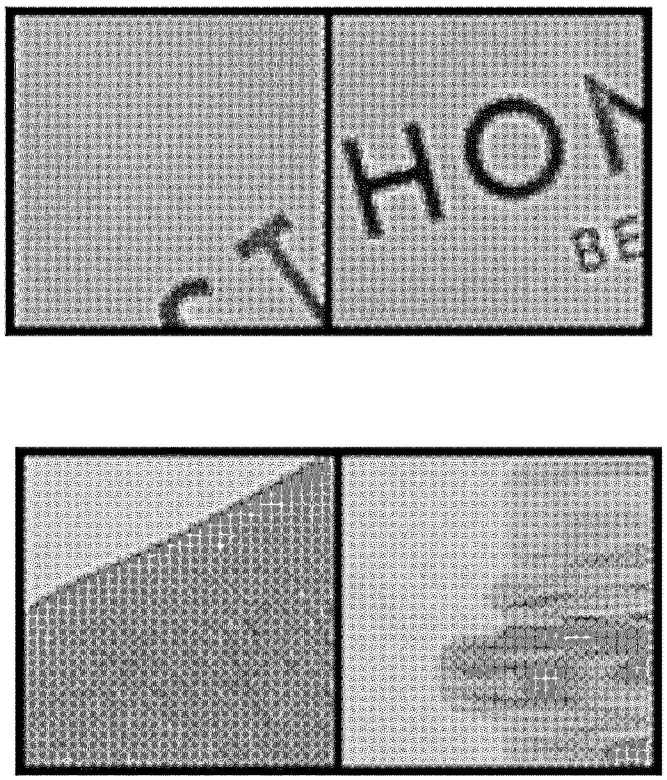
FIG. 13 illustrates crops taken from the example input image of FIG. 11.

Conditioning the discriminator on the latents may allow the discriminator to identify modes that are difficult to reproduce by the standard RD loss. An example of this process is shown in FIGS. 11 to 13. FIG. 11 shows an example image. FIG. 12 shows the output of discriminator that has been applied to the example image and a corresponding predicted image (respectively, left and center) together with a corresponding probability mass function of the discriminator output for the predicted image (right). We see that the discriminator can identify edges and textured regions by labelling them as "fake" in the generated images. The discriminator identifies the textured regions of one of the hands to be fake, as well as the text in the top image. The probability mass function assigns these areas higher probability, so that they are more likely to be drawn from during the resampling procedure, as seen in the crops taken from the image in FIG. 13.

We may further emphasize these regions by simply taking a weighted softmax of the discriminator output, as follows:

$$\hat{p}_{\hat{x}} = softmax(-\gamma D(\hat{x})) \quad (3)$$

where $\gamma>0$ is a tuning parameter that controls how much emphasis placed on fake patches (as determined by the discriminator). The resulting $\hat{p}_{\hat{x}}$ is a probability mass function defined over a grid the same size as the output of the discriminator. Sampling from this probability mass function results in sampling patches from the input of the discriminator. Therefore, by increasing $\gamma$, one can sample fake patches with much higher probability. The output of the discriminator may be downsampled compared to the input image or output image which may be used as an input to the discriminator. A single pixel of the output of the discriminator may correspond to a larger area of the input or output image.

We outline the Crop Resampling method in Algorithm 3. The method crops difficult patches of an image and iterates over them. We use the probability mass function given by Equation (3) to sample patches from the original and predicted image to iterate our training step over again. A plurality of patches may be sampled. The number of patches may be between two and five, preferably three. A separate discriminator may be used for the crops given that the image resolutions are different. This discriminator may be referred to as a sub-discriminator. The latent that is used to condition the crop discriminator may be cropped over the same region, after being upsampled and masked with a convolutional layer.

Algorithm 3
Pseudocode outlining the training of the generator with crops.

Inputs:
Generator Network: $f_\theta$
Generator Optimizer: $opt_{f_\theta}$
Discriminator: $D_\phi$
Discriminator Optimizer: $opt_{D_\phi}$
CropDiscriminator: $\tilde{D}_\phi$
CropDiscriminator Optimizer: $opt_{\tilde{D}_\phi}$
Loss for Generator: $\mathcal{L}_{f_\theta}$
Loss for Discriminators: $\mathcal{L}_{D_\phi}$
Training set: $X = \{x_1, \ldots, x_N\}$
Model Training:
for x in X do
  Discriminator Training:
    $\hat{x}, \hat{y} \leftarrow f_\theta(x)$ # Get prediction and quantized latent
    $\hat{d} \leftarrow D_\phi(\hat{x}.\text{detach}(\,), \hat{y}.\text{detach}(\,))$
    $d \leftarrow D_\phi(x, \hat{y}.\text{detach}(\,))$
    backpropagate $\mathcal{L}_{D_\phi}(d, \hat{d})$
    step $opt_{D_\phi}$ # Update discriminator
  Generator training with original image and crops:
  backpropagate $\mathcal{L}_{f_\theta}(x, \hat{x}, \hat{d})$
  $p_{\hat{d}}$ softmax$(\gamma \cdot \hat{d})$ # Convert $\hat{d}$ into prob. mass function
$\{(p_1, \hat{p}_1, \hat{y}_{\hat{p}_1}), \ldots, (p_M, \hat{p}_M, \hat{y}_{\hat{p}_M})\} \leftarrow$ sample the same M crops from x, $\hat{x}$, and $\hat{y}$ using distribution $p_{\hat{d}}$
  for $(p, \hat{p}, \hat{y}_{\hat{p}})$ in $\{(p_1, \hat{p}_1, \hat{y}_{\hat{p}_1}), \ldots, (p_M, \hat{p}_M, \hat{y}_{\hat{p}_M})\}$ do
    Crop Discriminator Training:
    $\hat{d} \leftarrow \tilde{D}_\phi(\hat{x}.\text{detach}(\,), \hat{y}_{\hat{p}}\cdot \text{detach}(\,))$
    $d \leftarrow \tilde{D}_\phi(x, \hat{y}_{\hat{p}}\cdot \text{detach}(\,))$
    backpropagate $\mathcal{L}_{\tilde{D}_\phi}(d, \hat{d})$
    step $_{\tilde{D}}opt_{\tilde{D}_\phi}$ # *Update discriminator*
    backpropagate $\mathcal{L}_{f_\theta}(p, \hat{p}, \hat{d})$
  end
  step $opt_{f_\theta}$
end It assumes the existence of 2 functions backpropagate and step.backpropagate uses backpropagation to compute gradients of all parameters with respect to the loss, and successive calls accumulate gradients.step performs an optimization step with the selected optimizer.

We outline Discriminator-based Data Augmentation method in Algorithm 4. This method may replace the standard random or center crop used for image augmentation with a cropping mechanism similar to that for Crop Resampling but applied to the original image size. We may use the probability mass function given by Equation (3) to identify parts of the unaugmented image that might be difficult for the generator to reproduce. We extract these parts in a crop of the original image of the desired size. The crop of the original image is then used for the training of the AI-based compression pipeline instead of or in addition to the original image. During the sampling process, we may refrain from storing the computation graph of the resulting operations from the discriminator and generator. The cropping method described fits naturally into the dataloaders framework used by modern deep learning libraries such as PyTorch, but we explicitly include it in the training loop for clarity.

Algorithm 4
Pseudocode outlining the training of the generator using images augmented by the discriminator.

Inputs:
Generator Network: $f_\theta$
Generator Optimizer: $opt_{f_\theta}$
Discriminator: $D_\phi$
Discriminator Optimizer: $opt_{D_\phi}$
Loss for Generator: $\mathcal{L}_{f_\theta}$
Loss for Discriminator: $\mathcal{L}_{D_\phi}$
Unaugmented set of images: $\tilde{X} = \{\tilde{x}_1, \ldots, \tilde{x}_N\}$
Model Training:
for $\tilde{x}$ in $\tilde{X}$ do
  Crop image with NoGrad( ):
    $\hat{\tilde{x}}, \hat{y} \leftarrow f_\theta(\tilde{x})$ # Get prediction and quantized latent
    $\hat{d} \leftarrow D_\phi(\hat{\tilde{x}}, \hat{y})$
    $_{\hat{d}}p_{\hat{d}} \leftarrow$ softmax$(\gamma \cdot \hat{d})$
    $x \leftarrow$ sample crop from $\tilde{x}$ using distribution $p_{\hat{d}}$
  Discriminator Training:
    $\hat{x}, \hat{y} \leftarrow f_\theta(x)$ # Get prediction and quantized latent
    $\hat{d} \leftarrow D_\phi(\hat{x}.\text{detach}(\,), \hat{y}.\text{detach}(\,))$
    $d \leftarrow D_\phi(x, \hat{y}.\text{detach}(\,))$
    backpropagate $\mathcal{L}_{D_\phi}(d, \hat{d})$
  step $opt_{\tilde{D}_\phi}$ # Update discriminator
  Generator Training:
    backpropagate $\mathcal{L}_{f_\theta}(x, \hat{x}, \hat{d})$
    step $opt_{f_\theta}$
end It assumes the existence of 2 functions backpropagate and step.backpropagate uses backpropagation to compute gradients of all parameters with respect to the loss, and successive calls accumulate gradients.step performs an optimization step with the selected optimizer. Moreover, NoGrad( ) refers to operations done without tracking the computation graph.

Adaptive Discriminators

As discussed above, neural image and video compression pipelines are optimized for both rate and distortion loss. The distortion loss can consist of different sub-losses, such as MSE and LPIPS. One of the more important distortion losses may be the adversarial loss (with a discriminator), which, in contrast to the previous two, does not represent a distance w.r.t. the ground truth image, but rather is a loss based solely on the likelihood that the observed image is real, i.e. has not been distorted by the compression pipeline. If the observed image is a reconstruction from a pipeline and thus has been distorted, it may be referred to as a fake image.

Adversarial losses are heavily present in other machine learning problems (e.g. generative modelling). However, in generative modelling the fake and real images are two distinct datasets that don't have any correspondence. In contrast, in compression every original image has its compressed counterpart. Therefore, there is a bijection between the two sets. This allows for adaptive discriminators that may take additional information or input into account on top of the image being discriminated.

The correspondence between the real and fake images in compression allows for more advanced applications of the discriminator. One example of this is the conditional discriminator (e.g. used in Fabian Mentzer, George Toderici, Michael Tschannen, and Eirikur Agustsson. High-fidelity generative image compression. arXiv preprint arXiv:2006.09965, 2020, which is hereby incorporated by reference, where the discriminator is further conditioned on the quantized latent representation of the compressed image).

The main motivation for adapting the discriminator is the large distribution of images. Some of the image may be easy to compress, while others may be hard. Therefore a different discriminator may be assigned to different images. This may be considered the use of adaptive discriminators. For example, it might be futile to apply a very complex critic to an image that already has high distortion, since the compression pipeline won't be able to account for the gradients it receives.

For the purpose of describing the examples of this method, $f_\theta$ may denote a compression pipeline such as that described above, where θ indicates the set of parameters $$f_{\theta_{enc}}^{enc},\ f_{\theta_{quant}}^{quant} \text{ and } f_{\theta_{dec}}^{dec}$$

may denote respectively the encoder, quantiser and decoder of our network and x denote the image we are encoding. So, $$y = f_{\theta_{enc}}^{enc}(x) \quad (4)$$

$$\hat{y} = f_{\theta_{quant}}^{quant}(y) \quad (5)$$

$$\hat{x} = f_{\theta_{dec}}^{dec}(\hat{y}) \quad (6)$$

where y denotes the latent representation of x, ŷ denotes the quantised version of y and x̂ denotes the reconstruction of x. The pipeline is the composition of the encoder, quantiser and decoder:

$$f_\theta = f_{\theta_{dec}}^{dec} \circ f_{\theta_{quant}}^{quant} \circ f_{\theta_{enc}}^{enc} \quad (7)$$

Let's also denote by $h_\psi$ the discriminator with parameters ψ.

The first approach of adapting the discriminator is based on conditioning on deep features. As we have mentioned in the introduction the conventional way to apply the discriminator in generative modelling is only on the real image x and fake image X.

$$p_{real} = h_\psi(x) \quad (8)$$

$$p_{fake} = h_\psi(\hat{x}) \quad (9)$$

However, we can also adapt the discriminator by conditioning it on other variables produced by the pipeline $f_\theta$, e.g. intermediate ones. For instance in Fabian Mentzer, George Toderici, Michael Tschannen, and Eirikur Agustsson. High-fidelity generative image compression. arXiv preprint arXiv: 2006.09965, 2020, the discriminator is conditioned on the quantized latent ŷ:

$$p_{real} = h_\psi(x, \hat{y}) \quad (10)$$

$$p_{fake} = h_\psi(\hat{x}, \hat{y}) \quad (11)$$

However, the discriminator may be conditioned on any additional input variable z produced by the compression pipeline.

$$p_{real} = h_\psi(x, z) \quad (12)$$

$$p_{fake} = h_\psi(\hat{x}, z) \quad (13)$$

A number of examples of additional inputs to the discriminator are provided below.

Original Image Conditioning

The discriminator could be conditioned on the original image x, by setting z=x. This is image adaptive discriminator. There is one potential problem, because in $p_{real}=h_\psi(x, x)$ the discriminator could in theory detect that the discriminated image is the same as the conditioned image and thus learn to output a probability of 1 in these cases. However, this issue may be minimized by conditioning on x where the image passes through a narrow section of the discriminator network that removes enough information.

Rate Conditioning

Based on the latent representation y and the learnt entropy parameters $\theta_{entropy}$ the compression pipeline also calculates the second objective, namely the rate loss (denoted by R). We can condition the discriminator on R (i.e. z=R) so that the discriminator will take into account the difficulty of compressing the original image. In this way, the discriminator can be more strict or complex for images with good reconstructions and more lenient for images with bad reconstruction.

Latent Space Conditioning $y_{enc}$ and $y_{dec}$ may denote the intermediate variables produced in at least one of the intermediate layers, respectively by the encoder and decoder of our pipeline. As an example, we can condition the discriminator on any subset of $y_{enc}$ and $y_{dec}$.

Other Deep Feature Conditioning

Let $g_\phi$ denote another fixed neural network for feature extraction (not our compression pipeline). and $x_{feat}=g_\phi(x)$ are the features produced by this network. We can condition on $z=x_{feat}$. The fixed neural network may have been trained for a different task that is not related to the compression of images. For example, the fixed neural network may have been trained for image classification.

The concept may also be applied in the context of the compression of videos. In any case where an image is used as an input to the discriminator, a plurality of frames of a video may instead be used as an input, for example where the plurality of frames are concatenated in a plurality of channels of the input. This concept may also be applied at intermediate stages of the pipeline, for example a plurality of variables based on the plurality of frames from an intermediate step may be used as an input. Inputs from a plurality of rates based one of more of the plurality of frames may also be used.

Below is provided examples of how the conditioning on z could be implemented:

Channel Concatenation

Let $$h_{\psi_{img}}^{img} \text{ and } h_{\psi_{cond}}^{cond}$$

denote respectively the parts of the discriminator that are applied on x/x̂ and z and let denote by $$h_{\psi_{final}}^{final}$$

the final part of the discriminator. Let's also denote by •||• concatenation along the channel dimension. In this example the conditioning may be performed as follows:

$$h_\psi(x, z) = h_{\psi_{final}}^{final}\left(h_{\psi_{img}}^{img}(x) \,\|\, h_{\psi_{cond}}^{cond}(z)\right) \tag{14}$$

Kernel Prediction

Here, a kernel prediction network (meta network)

$$h_{\psi_{kern}}^{kern}$$

is used to predict the kernels (i.e. parameters) another network $h^{discr}$. So the overall discriminator is the following:

$$\psi_{discr} = h_{\psi_{kern}}^{kern}(z) \tag{15}$$

$$h_\psi(x, z) = h_{\psi_{discr}}^{discr}(x) \tag{16}$$

equivalently $$h_\psi(x, z) = h_{\left(h_{\psi_{kern}}^{kern}(z)\right)}^{discr}(x) \tag{17}$$

In the different types of conditioning variables z and types of architectures of conditioning described above the variable z could optionally be passed through a nogradients function that prevents the tracking of gradients and treats z as a constant. This operation is executed before being forwarded to the discriminator. If nogradients is used z will be reassigned as follows:

$$z_{nograd} = nogradients(z) \tag{18}$$

$$p_{real} = h_\psi(x, z_{nograd}) \tag{19}$$

$$p_{fake} = h_\psi(\hat{x}, z_{nograd}) \tag{20}$$

An alternative way to make the discriminator $h_\psi$ adapt to the current image being compressed x is by using a set of discriminators. In contrast to the previous approach here we choose the most appropriate discriminator, not by conditioning, but by selecting the best discriminator from a set.

Let G denote our fixed set of K discriminators with adjustable parameters:

$$G = \left\{h_{\psi_1}^1, h_{\psi_2}^2, \ldots, h_{\psi_K}^K\right\} \tag{21}$$

where $\psi_1, \psi_2, \ldots, \psi_K$ are the respective parameters. These discriminators do not necessarily have the same architecture. E.g. they all could have different architectures, or some of the architectures might coincide and some might not.

Let's assume x is an image from our training dataset. For each discriminator $h_{\psi k}$, we can calculate the perceptual probabilities of x and x̂:

$$p_{real}^k = h_{\psi_k}^k(x) \tag{24}$$

$$p_{fake}^k = h_{\psi_k}^k(\hat{x}) \tag{23}$$

Based on these two probabilities and an objective function r(•,•) an objective score can be calculated for the current discriminator as follows:

$$r_k = r\left(p_{real}^k, p_{fake}^k\right) \tag{24}$$

Then the optimal discriminator $h^{k*}$ for the current image x is selected by finding either the minimal or maximal objective score from the scores of all discriminators:

$$k^* = \arg\min_k r_k \text{ or } k^* = \arg\max_k r_k \tag{25}$$

Once the optimal discriminator is selected for the current image x, we can calculate the adversarial loss based on $h^{k*}$ and use it to update the weights of the pipeline $f_\theta$ (a.k.a. the generator).

For each of our discriminators from G we can calculate the discriminator loss w.r.t. the current image x and use it to update their respective weights.

In the described way, every discriminator is trained based on loss from all the images, but the generator loss for individual images consists of the loss from one discriminator only, namely the optimal discriminator $h^{k*}$ for the current image x w.r.t. the objective function r.

An example of an objective function r(•,•) is provided below. Let's define that the ideal $p_{real}$ should be as close as possible to 0.5+s and the ideal $p_{fake}$ should be as close as possible to 0.5−s, where s∈[0,0.5] is defined as the desired saturation level. Let d(•,•) define any distance, e.g. $L_1$ or $L_2$. We can define r as the average distance of $p_{real}$ and $p_{fake}$ to the desired saturation level:

$$r(p_{fake}, p_{real}) = \frac{d(p_{real}, 0.5 + s) + d(p_{fake}, 0.5 - s)}{2} \tag{36}$$

In algorithm 5 we present an example of an algorithm that implements the described procedure for adaptive discriminators with a set of discriminators.

Algorithm 5 Example pseudocode that outlines one training step of the generator $f_\theta$(i.e. compression pipeline) and the set of discriminators $D = \{h^1_{\psi_1}, h^2_{\psi_2}, \ldots, h^K_{\psi_K}\}$. It assumes the existence of 3 functions backpropagate, step and nogradients. backpropagate uses backpropagation to compute gradients of all parameters with respect to the loss. step performs an optimization step with the selected optimizer. The function nogradients ensures no gradients are tracked for the function executed. The function nogradients refers to how deep learning frameworks such as PyTorch and Tensorflow V2 construct a computational graph that is used for the back-propagation operation. This means that producing $\hat{x}$ with or without gradients impacts whether or not $f_\theta$ will be part of the computational graph, and therefore whether or not gradients can flow through the generator component. Therefore whether $\hat{x}$ is produced from $f_\theta$, with or without gradients matters, for the back-propagation and optimizer update step.

Inputs:
Input image: x
Generator (compression) network: $f_\theta$
Generator optimizer: $opt_{f_\theta}$ Set of discriminator networks: $G = \{h^1_{\psi_1}, h^2_{\psi_2}, \ldots, h^K_{\psi_K}\}$ $\{opt_{h^1_{\Psi_1}}, opt_{h^2_{\Psi_2}}, \ldots, opt_{h^K_{\Psi_K}}\}$ Classification loss of discriminator (for real images): $\mathcal{L}_{discr,real}$
Classification loss of discriminator (for predicted images): $\mathcal{L}_{discr,pred}$
Classification loss of generator (for predicted images): $\mathcal{L}_{gen}$
Additional loss for generator: $\mathcal{L}_{add}$
Reconstruction:
$\hat{x} \leftarrow f_\theta(x)$
Discriminator training:
$\hat{x}_{nograd} \leftarrow \text{nogradients}(\hat{x})$ for k in {1, … , K}: $p^k_{discr,real} \leftarrow h^k_{\psi_k}(x)$ for k in {1, … , K}: $p^k_{discr,fake} \leftarrow h^k_{\psi_k}(\hat{x}_{nograd})$ for k in {1, … , K}: $\mathcal{L}^k_{discr} \leftarrow \mathcal{L}_{discr,real}(p^k_{discr,real}) + \mathcal{L}_{discr,pred}(p^k_{discr,pred})$ for k in {1, … , K}: $backpropagate(\mathcal{L}^k_{discr})$ $\text{step}(opt_{h^k_{\Psi_k}})$ Objective scores calculation and optimal discriminator:

for k in {1, … , K}: $r^k = r(p^k_{discr,real}, p^k_{discr,fake})$ $k^* = \arg\min_k r_k$ or $k^* = \arg\max_k r_k$ Generator training:

$p_{gen,pred} \leftarrow h^{k^*}_{\psi_{k^*}}(\hat{x})$ $\mathcal{L}_{adv} \leftarrow \mathcal{L}_{gen}(p_{gen,pred})$
$\mathcal{L} \leftarrow \mathcal{L}_{adv} + \mathcal{L}_{add}(x, \hat{x})$
backpropagate($\mathcal{L}$)
step($opt_{f_\theta}$)

Discriminator Regularization

As discussed above, all lossy compression algorithms aim to strike a balance between visual fidelity, the distortion, and the file size, expressed via the rate. In neural compression algorithms, this rate-distortion-tradeoff is governed by the specific choice of training procedure, neural network architecture, regularization etc. Recently, a third axis along which there exists a tradeoff has come into focus, that of perception. This tradeoff is hence known as the distortion-perception-tradeoff.

For a given image, distortion measures how closely the compressed image matches the uncompressed image. On the other hand, perception quantifies how likely it is that the compressed image comes from the distribution of uncompressed images. While this distinction is subtle, this has some concrete practical implications, as a reference (uncompressed) image is generally not needed to assess the perception. Rather, in the context of compression, perception measures how 'natural' a compressed image seems to the human observer. This in particular includes the presence of compression artefacts, which are not desirable to the human observer.

In practice, the main challenge is designing (or learning) perception measuring functions that model the human visual system (HVS) faithfully. This is because the HVS does not generally align too well with simplistic distortion measures such as Euclidean distances. As such, perception can be seen as an instance of visual loss.

One extremely powerful method for learning such perception measuring functions is via the idea of adversarial learning, an idea pioneered by generative adversarial networks (GANs). Adversarial learning consists of two 'competing' networks, in our case the compression decoder and a so-called discriminator network. Here, the two networks are trained in an alternating fashion, where the discriminator's goal is to distinguish uncompressed from compressed images by providing a score from 0 (fake/compressed) to 1 (real/uncompressed). The decoder's goal on the other hand is to 'fool' the discriminator by creating more and more 'realistic' images. Hence, the discriminator can be viewed as a 'teacher' for the 'decoder'.

Here, the capabilities of the discriminator for a should be tuned towards the decoder's capabilities: If a discriminator succeeds at distinguishing compressed from uncompressed images, is this because the discriminator is good or is this because the decoder is bad? The goal in this framework is to obtain a decoder that is as good as possible. Due to limitations such as the number of parameters, the depth of the network etc. (which are results of hardware and runtime side-constraints), there is an upper limit of the performance of the decoder. In practice, it is hence important to design a discriminator that is only powerful enough to reach an equilibrium with the best possible performance of this decoder. In everyday terms, this would be akin to a teacher that challenges the student at just the difficulty level that the student is.

In GAN training (and in particular Wasserstein GAN) training, the spectral norm of each convolutional layer of the discriminator is set to 1. This ensures that the Lipschitz constant of the network (measured in terms of the 2-norm both in input and output space) can't be too large. In particular, if ReLU or leaky ReLU activation functions are used, this leads to the Lipschitz constant of the whole discriminator being at most 1. This can be viewed as a sort of regularization, which limits the expressiveness of the discriminator and can be used to tune the discriminator's capabilities towards an equilibrium with the generator's capabilities The above value of 1 is, however, quite arbitrary. For different depths and parameter counts of the discriminator and generator, a different amount of regularization can be applied. In this context, one can, after normalizing to 1, multiply the convolution's kernel by an arbitrary positive number, i.e.

$$y = conv(x, c \cdot K),$$

where x is an input feature, K is the normalised kernel and $c \in (0, \infty)$. The arbitrary number may be greater than or less than 1. This means that the thus scaled convolution operator $x \mapsto H\ conv(x, c \cdot K)$ has Lipschitz constant c, which can be tuned arbitrarily by the user and set at a predetermined value. The arbitrary number may be set at different predetermined values for different filters of the discriminator.

While spectral normalization gives exact guarantees (the global Lipschitz constant is upper bounded), gradient penalties, like the popular $R_1$ penalties allow for a more flexible control of the local Lipschitz constant. The training of the thus-regularized network can thus potentially assign larger Lipschitz constants where necessary.

If a discriminator is described by the scalar-valued function $f: \mathbb{R}^{\mathbb{N}} \to \mathbb{R}$, these $R_1$-penalties are realised via adding $$\lambda \|\nabla f(x)\|_2^2$$

(or using some other norm) to the loss function, for some penalty parameter $\lambda \in (0, \infty)$ and discriminator input x. This can be used in a straightforward manner for standard, non-patch discriminators. In compression however, patch-based discriminators are used, which can be described by functions $f: \mathbb{R}^{\mathbb{N}} \to \mathbb{R}^M$ with multi-dimensional output. In these cases, generalisations with feasible training times may be beneficial. If one simply penalises $$\lambda \sum_{i=1}^{M} \|\nabla f_i(x)\|_2^2$$

(where $f_i$ denotes the i-th patch's output function), this increases the computational and spatial complexity by a factor of (roughly) M, making training with this penalty more difficult.

Note that $$\sum_{i=1}^{M} \|\nabla f_i(x)\|_2^2 = \|J_f\|_F^2,$$

the squared Frobenius norm of the Jacobian of $f$, denoted $J_f$.

Note that $$\|J_f\|_F^2 = \mathbb{E}_{v \sim \mathcal{N}(0, I_N)}\left[\|J_f \cdot v\|_2^2\right],$$

meaning that one can approximate this Frobenius norm by drawing some number of multivariate (N-dimensional) standard normal vectors and averaging the Jacobian-vector product. Note further that $$\|J_f\|_F = \left\|J_f^T\right\|_F,$$

i.e. the Frobenius norms of the Jacobian and transpose of the Jacobian coincide, meaning that one can instead approximate $$\|J_f\|_F^2 = \mathbb{E}_{v \sim \mathcal{N}(0, I_M)}\left[\left\|J_f^T \cdot v\right\|_2^2\right].$$

$$J_f^T \cdot v$$

is known as the vector-Jacobian-product and can be computed using reverse-mode-autodifferentiation. This is in practice about twice as fast as the computation of the Jacobian-vector-product. In practice, one can thus penalize $$\lambda \|J_f\|_F^2 \approx \lambda \frac{1}{n} \sum_{i=1}^{n} \|J_f^T \cdot v^{(i)}\|_2^2,$$

where $v^{(i)} \sim \mathcal{N}(0, I_M)$ are randomly-drawn normally-distributed vectors. The number of samples can be as low as n=1. However, the accuracy of the approximation may increase if more samples are used.

Another way of approximating $$\|J_f\|_F^2$$

is via $$\|J_f\|_F^2 \approx \mathbb{E}_{v \sim N(0,\sigma I_N)}\left[\frac{1}{\sigma^2}\left(\|f(x+v)\|_2^2 - \|f(x)\|_2^2\right)\right],$$

where $\sigma \in (0, \infty)$. This estimate tends to become more accurate for smaller $\sigma$. It can, however, be also used with larger values of $\sigma$, which takes into account the nonlinear structure of $f$.

In practice, one can use $$\lambda \frac{1}{n} \sum_{i=1}^{n} \left[\frac{1}{\sigma^2}\left(\|f(x+v^{(i)})\|_2^2 - \|f(x)\|_2^2\right)\right],$$

where $v^{(i)} \sim \mathbb{R}(0, I_M)$ are randomly-drawn normally-distributed vectors. The number of samples can be as low as n=1. However, the accuracy of the approximation may increase if more samples are used.

The invention claimed is:

1. A method of training one or more neural networks, the one or more neural networks being for use in lossy image or video encoding, transmission and decoding, the method comprising the steps of:

receiving a first input training image;

encoding the first input training image using a first neural network to produce a latent representation;

performing a quantization process on the latent representation to produce a quantized latent;

decoding the quantized latent using a second neural network to produce an output image, wherein the output image is an approximation of the input training image; evaluating a loss function based on differences between the output image and the input training image;

evaluating a gradient of the loss function;

back-propagating the gradient of the loss function through the first neural network and the second neural network to update the parameters of the first neural network and the second neural network; and repeating the above steps using a first set of training images to produce a first trained neural network and a second trained neural network;

wherein the differences between the output image and the input training image is determined based on the output of a neural network acting as a discriminator;

the neural network acting as a discriminator receives the output image as an input and outputs one or more values associated with one or more sub-sections of the output image, wherein each value indicates the likelihood that the corresponding sub-section of the output image is a fake sub-section, and back-propagation of the gradient of the loss function is additionally used to update the parameters of the neural network acting as a discriminator.

2. The method of claim 1, wherein the output of the neural network acting as a discriminator is converted to a probability distribution, wherein the value of the probability distribution is defined for each of the one or more sub-sections and is proportionate to the value indicating the likelihood that the corresponding sub-section of the output image is a fake sub-section.

3. The method of claim 2, wherein the conversion to a probability distribution is performed using a softmax function.

4. The method of claim 1, further including the step of providing the one or more sub-sections of the output image to a neural network acting as a sub-discriminator;

wherein the neural network acting as a sub-discriminator outputs one or more values associated with the one or more sub-sections of the output image, each value indicating the likelihood that the corresponding sub-section of the output image is a fake sub-section; and the differences between the output image and the input training image is additionally determined based on the output of the neural network acting as a sub-discriminator; and back-propagation of the gradient of the loss function is additionally used to update the parameters of the neural network acting as a sub-discriminator.

5. The method of claim 4, wherein the one or more sub-sections of the output image are determined by sampling the probability distribution.

6. The method of claim 4, wherein two to five sub-sections of the output image are provided to the neural network acting as a sub-discriminator, preferably wherein three sub-sections of the output image are provided.

7. The method of claim 1, wherein the neural network acting as a discriminator additionally receives the quantized latent as an input.

8. The method of claim 2, further comprising the steps of, after the output of the neural network acting as a discriminator is converted to a probability distribution:

sampling the probability distribution to select a sub-section of the output image; encoding the corresponding sub-section of the input image to the selected sub-section of the output image using the first neural network to produce a sub-latent representation; performing a quantization process on the sub-latent representation to produce a quantized sub-latent;

decoding the quantized sub-latent using a second neural network to produce an output sub-image, wherein the output sub-image is an approximation of the sub-section of the input image;

wherein the evaluation of the loss function and back propagation of the gradient of the loss function to update the parameters of the neural networks is performed based on the output sub-image and the sub-section of the input image.

9. A method for lossy image or video encoding, transmission and decoding, the method comprising the steps of:

receiving an input image at a first computer system;

encoding the first input training image using a first trained neural network to produce a latent representation;

performing a quantization process on the latent representation to produce a quantized latent;

transmitting the quantized latent to a second computer system; and decoding the quantized latent using a second trained neural network to produce an output image, wherein the output image is an approximation of the input training image; wherein the first trained neural network and the second trained neural network have been trained according to the method of claim 1.

10. A data processing system configured to perform the method of claim 1.

* * * * *